(12) United States Patent
Sparkes et al.

(10) Patent No.: US 9,639,540 B2
(45) Date of Patent: May 2, 2017

(54) RETENTION MANAGEMENT IN A WORM STORAGE SYSTEM

(75) Inventors: Andrew Sparkes, Bristol (GB); Michael J Spitzer, Portland, OR (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1833 days.

(21) Appl. No.: 13/034,900

(22) Filed: Feb. 25, 2011

(65) Prior Publication Data

US 2012/0221811 A1    Aug. 30, 2012

(51) Int. Cl.
*G06F 12/00* (2006.01)
*G06F 17/30* (2006.01)

(52) U.S. Cl.
CPC .. *G06F 17/30085* (2013.01); *G06F 17/30171* (2013.01); *G06F 17/30362* (2013.01)

(58) Field of Classification Search
CPC ............................ G06F 17/30188; G06F 3/067
See application file for complete search history.

(56) References Cited

U.S. PATENT DOCUMENTS

| 7,366,834 B2 | 4/2008 | McGovern et al. |
| 7,430,570 B1 | 9/2008 | Srinivasan et al. |
| 7,590,807 B2 | 9/2009 | McGovern et al. |
| 7,653,671 B2 | 1/2010 | Ikezawa et al. |
| 7,680,830 B1 | 3/2010 | Ohr et al. |
| 7,752,401 B2 | 7/2010 | Merrick et al. |
| 8,170,985 B2 * | 5/2012 | Zimran et al. ............... 707/609 |
| 2005/0076066 A1 | 4/2005 | Stakutis et al. |
| 2006/0085487 A1 * | 4/2006 | Hara et al. .................... 707/200 |
| 2008/0172563 A1 | 7/2008 | Stokes |
| 2009/0049003 A1 | 2/2009 | Hsu |

* cited by examiner

*Primary Examiner* — Baboucarr Faal
(74) *Attorney, Agent, or Firm* — Hewlett Packard Enterprise Patent Department (57) ABSTRACT

A write-once-read-many, WORM, storage system is arranged to store datasets each with associated attributes including a WORM attribute indicating the dataset's WORM status, and to protect from change or deletion WORM datasets, and at least certain of their attributes including those relevant to WORM status. Retention management capabilities are provided for such a storage system, including the ability to set a given dataset for retention for a particular retention period by storing a corresponding retention date in an attribute of the dataset, and setting the WORM attribute to indicate that the dataset is a WORM dataset. Also provided is the ability to determine expiry of the retention period for the given dataset, and then to remove the stored retention date and change the WORM attribute of the dataset to indicate that it is no longer a WORM dataset.

6 Claims, 5 Drawing Sheets

RETENTION MANAGEMENT IN A WORM STORAGE SYSTEM

BACKGROUND

Many regulatory authorities and enterprise internal policies require the retention of certain data for a specified period (the "retention period"). As the data required to be retained in this manner is generally intended to provide a reliable record of contemporaneous events (such as stock exchange transactions), the data held in retention is required to be protected against change, at least to some degree.

Much of the data subject to a data retention regime will be in electronic form. Write-once-read-many, WORM, storage systems are well suited for retaining electronic data in immutable form. In a WORM storage system, data to be retained is stored in WORM files and the system provides protection mechanisms preventing changes to the file and at least some of its metadata. Generally, a WORM storage system is not limited to the storage of WORM files and may store non-WORM files as well; as a consequence, the protection provided to WORM files includes protection of the designation of a file as a WORM file, whatever form this designation may take.

In the context of data retention, the "write once" in relation to a WORM file refers to the form of the file data at the point the file is designated a WORM file (it being understood that the file may have undergone many re-writes before this point). From the point of view of resource efficiency, a WORM file created to comply with a particular data retention regime should only be maintained as such for as long as needed to comply with the retention period specified. Therefore, a retention end date (herein "retention date") is generally stored as metadata along with the WORM file, the retention date having been determined at the time the WORM file is created on the basis of the retention period (or the longest such period) applicable to data in the file.

Upon expiry of the retention period associated with a WORM file (as judged by comparing the retention date held in the file's metadata with the current time, inclusive of date, provided by a reference time source), the WORM storage system is generally arranged to permit the file's WORM designation to be rescinded. Changes can thereafter be made to the file, subject to normal access permissions. This gives rise to a potential way of illicitly changing file data during its retention period; more particularly, if either the stored retention date can be rolled back to the present or the reference time source rolled forward to the stored retention date, the WORM storage system can be tricked into believing that the retention period for a particular WORM file has expired, and allow the WORM designation of the file to be rescinded and data in the file changed. By restoring WORM designation to the changed file and resetting the stored retention date or reference time source (whichever was changed), the fact that the file data has been altered can be hidden. For this reason, the protection of the metadata storing the retention date, and the trustworthiness of the current time source, are pertinent considerations in any WORM storage system used for implementing a data retention regime.

BRIEF DESCRIPTION OF THE DRAWINGS

Embodiments of the invention will now be described, by way of non-limiting example, with reference to the accompanying diagrammatic drawings, in which.

DETAILED DESCRIPTION

Figure 1:
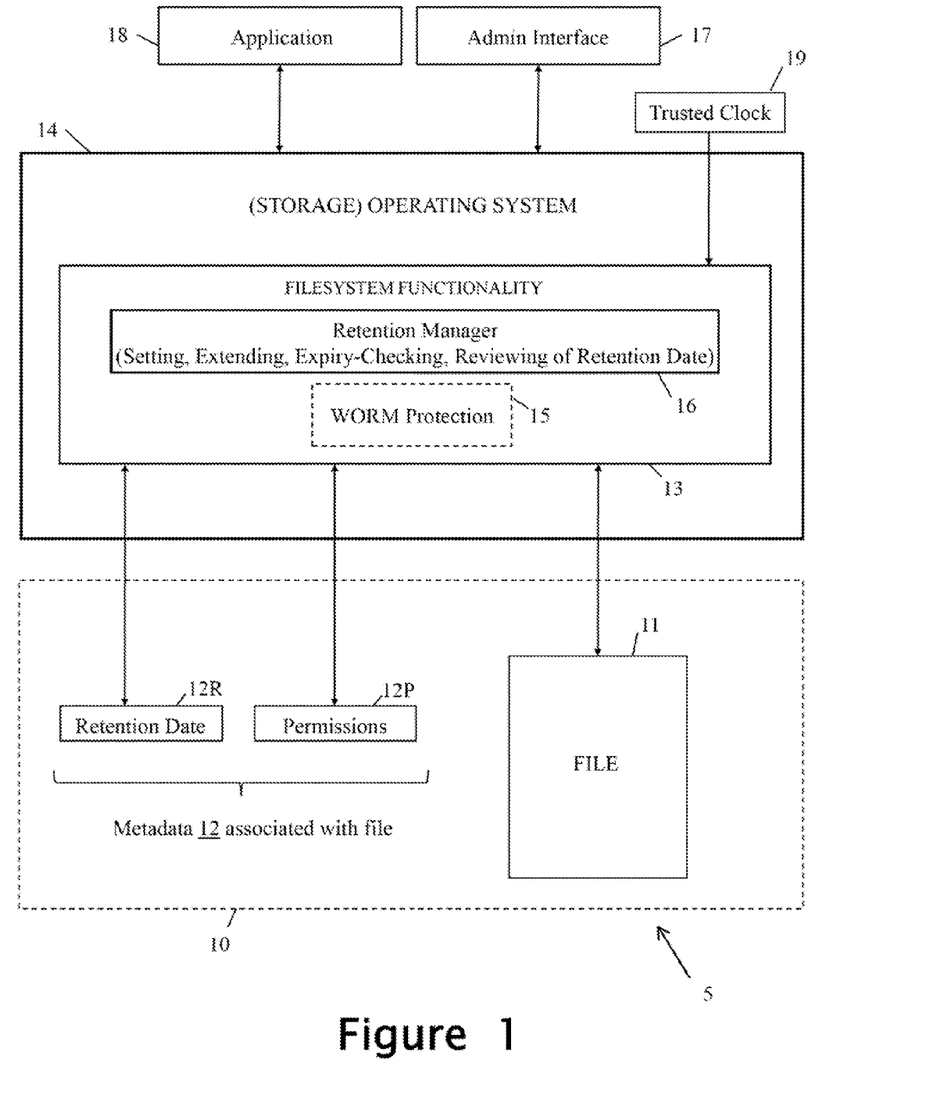
FIG. 1 is a diagram illustrating the logical inter-relationship of the main software and data elements of a WORM storage system implementing an example retention management method and system embodying the present invention.

FIG. 1 depicts the main software and data elements of a WORM storage system 5 and the general relationship to these elements of an example retention management utility (herein 'retention manager') embodying the present invention.

More particularly, the WORM storage system 5 implements a filesystem 10, that is, an organization of data, held on storage, and comprising one or more files 11 and associated metadata 12 (represented in FIG. 1 by metadata elements 12P, 12R generally referred to herein as "attributes" of the file). The filesystem storage is typically provided by one or more hard disk drives or other, normally rewritable, storage devices (not shown in FIG. 1). Implementation of the filesystem 10 is under the control of filesystem functionality 13 that typically forms part of the executable operating system code 14 of the computing platform managing the storage system 5. Where the operating system is specifically tailored for use in a storage system it is often referred to as a 'storage operating system'. The filesystem functionality 13 could alternatively be provided by executable code separate from the operating system 14.

In the context of a WORM storage system such as the FIG. 1 system 5, the filesystem functionality 13 is arranged to provide certain WORM protection features 15 in respect of files that are designated as WORM files, that is, files that are not to be changed but only read. As used herein, the "WORM status" of a file is to be understood as referring to whether or not the file is designated a WORM file and therefore whether or not it is subject to protection by the WORM protection features 15.

The WORM protection features 15 provided by the filesystem functionality 13 will, in fact, mostly already be present in connection with enforcing file access permissions (that is, read, write and execute permissions for various types of user). The WORM protection features 15 include the prevention of deletion of, or any change to, a WORM file and at least certain of its attributes (including those relevant to WORM status, see below), the prevention of deletion of, or any change to, the path or directory structure for locating the file, and the prevention of any recovery, rollback or restoration function that could affect the file or its metadata, path or directory structure. As will be described below, certain limited exceptions to the application of the WORM protection features may be appropriate.

While it is possible to arrange for a WORM storage system to hold only WORM files so that any file stored in the system is automatically treated as having been designated a WORM file and therefore subject to the WORM protection features, this is a somewhat restrictive arrangement. Thus generally, as in the case of the storage system 5, WORM storage systems are adapted to hold both WORM and non-WORM files and the WORM protection features are only applied in respect of the WORM-designated files and their metadata. The designation of a file as a WORM file is achieved using the file's metadata and may be directly designated using a dedicated WORM-status attribute or implied in the value of a more general attribute. In particular, where a 'permissions' attribute (such as attribute 12P in FIG. 1) is used to record file access permissions (typically 'read', 'write', 'execute' permissions for one or more types of user), then the setting of this attribute to indicate that only read access is permitted for all user types, can equally be taken to indicate that a file is to be treated as a WORM file and that, accordingly, the WORM protection features should be applied. Hereinafter the term "WORM attribute" will be used to mean the attribute being used to indicate the WORM status of a file and is to be understood as encompassing both a dedicated WORM-status attribute and an attribute, such as a 'permissions' attribute, from which the WORM status of a file can be inferred.

As already noted, the WORM protection features 15 are applied not only to WORM files but also to at least certain of its attributes "including those relevant to WORM status"; clearly, the WORM attribute is one such attribute relevant to WORM status.

Even where the WORM storage system 5 is intended for use only as a data-retention archive, having the ability to store non-WORM files is useful as it allows some delay to be permitted between when a file is passed to the system and when its retention date is set and the file committed to WORM status.

In its simplest form, a WORM storage system can be operated without the use of retention dates to specify the period for which a WORM file is to continue to be treated as such. In this case, since the WORM protection features 15 protect not only a WORM file but also the file's WORM attribute indicating its WORM status, a WORM file once so designated will remain as such and consume resources forever; clearly, this is undesirable and for such a basic system, the WORM protection features 15 are normally arranged to allow a privileged user to change the WORM status of a file.

More commonly, a WORM storage system, such as the FIG. 1 system 5, includes a retention manager 16 which enables a retention period to be set for each file that is to be treated as a WORM file; in this case, the WORM protection features 15 are arranged to allow the WORM attribute of a file, once set to designate the file as a WORM, only to be changed after the retention date is reached (and, even then, the ability to do this may be restricted to a privileged user). Of course, it would also be possible to arrange for the WORM protection features to allow the WORM attribute of a file to be changed during its retention period, for example, by a privileged user. Exactly what provision is made for changing the WORM status of a file will depend on the regulatory requirements or enterprise policy behind the retention regime being implemented by the storage system. In the present example WORM storage system 5 of FIG. 1, it will be hereinafter assumed, for the purposes of illustration, that the WORM protection features 15 of the filesystem functionality 13 prevent deletion of, or any change to, a WORM file, and at least certain of its attributes including those relevant to WORM status, during the currency of a retention period that has been set for the file.

As already noted, regarding the file attributes protected by the WORM protection features, the phrase "those attributes relevant to WORM status" encompasses the WORM attribute of a file; as used herein, this phrase is also to be taken as encompassing the attribute (whatever its form) used to store the data indicative of the retention date (that is, the retention period end date) applying to a file. Such a retention date attribute is clearly one relevant to the WORM status of a file since, after the retention date indicated by the attribute, the WORM status of the file can be changed. Protection of the retention date attribute is desirable because, as discussed in the introduction, alteration of the stored retention date is one way in which a WORM file can be illicitly changed.

In the FIG. 1 storage system, setting a retention period for a file 11 is under the control of the retention manager 16 which is arranged to receive input regarding the required retention period either from an administrator through interface program 17, or from an application 18 that automatically determines an appropriate a retention period for the file 11. The retention manager 16 is operative to convert the retention period into a retention date (that is, the date defining the end of the retention period) and to store this date as file attribute 12R.

As well as initially setting the retention date, the retention manager 16 is also responsible for managing its subsequent extension, for periodically checking for expiry of the retention period set for a file, and for having an administrator, or other party, review and determine what to do with a file that has exited its retention period. Checking for expiry of a retention period is done with reference to a trusted time source (trusted clock 19 in FIG. 1) that can be implemented in a variety of ways. For example, the trusted clock 19 can be implemented as a tamper-proof hardware module, or as a count of a repeating system process, or be based upon a trusted third-party clock; indeed, if the computing platform running the operating system 14 is sufficiently trusted, the operating system clock could be used for the trusted clock 19.

In the FIG. 1 WORM storage system 5, the retention manager 16 is shown as part of the filesystem functionality 13. However, it is alternatively possible to implement the retention manager 16 as a utility outside of the filesystem functionality 13 and, indeed, outside the operating system 14. In this case, the operating system / filesystem functionality 13 will need to authenticate communications from the retention manager 16 (unless a trusted communications path is used) before implementing any changes that effect a retention date or the WORM status of a file.

Metadata may be held within the file data structure or separately. By way of example, and without restriction as to how embodiments of the invention may hold metadata, it will be assumed for the remainder of the description that file metadata is held separately of the file in an associated "inode" data structure as used by Linux and other Unix-like operating systems (that is, one that behaves in a manner similar to a Unix system).

Figure 2:
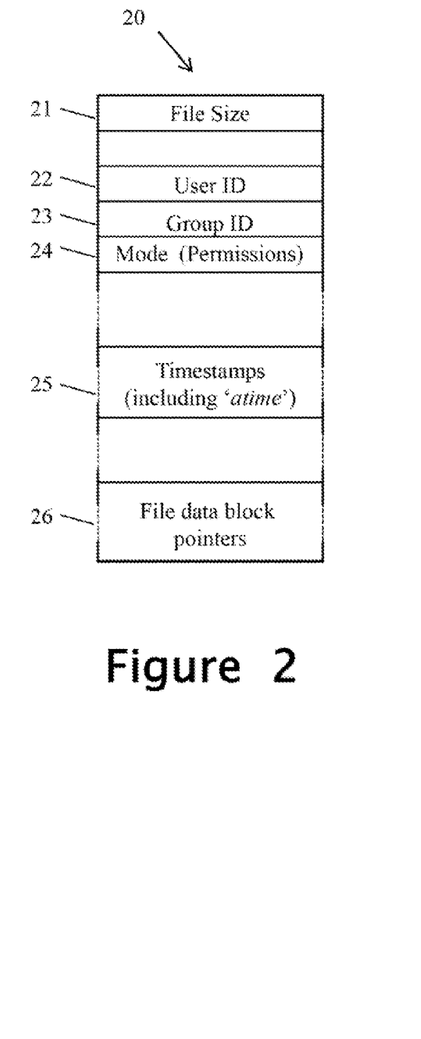
FIG. 2 is a diagram of an inode data structure.

FIG. 2 depicts an inode data structure 20 and shows, in no particular order, some of the standard (always present) attributes that it stores in respect of the associated file. These attributes include:

File data-block pointers 26 that point directly or indirectly to the data blocks holding the file data;

A file size attribute 21;

User and group IDs 22, 23 that respectively identify the file owner (by default, its creator) and a specific set of users;

A 'mode' attribute 24 that holds file type and access permission information; and A set of timestamps 25 including for when the file was last changed (known as 'mtime' for modification time) and for when the file was last accessed (known as 'atime' for access time).

Regarding file access permissions, in Linux and other Unix-like operating systems, there are mandatory access permissions for every object including files. Each object has three types of permissions, read ('r'), write ('w') and execute ('x') which are defined for three types of user, namely, the file owner, the group, and world (all other users). The so-called 'root' user or administrator is a further, privileged, user who can normally change permissions for any other user in respect of any file; however, when WORM protection features are being applied, even the privileged user may be prevented from changing a file or its metadata (as already noted, this will depend on the retention regime being implemented).

The mode attribute 24 uses a ten character string to indicate file type (first character) and access permissions (the remaining nine characters). Each of the nine permission characters indicates the existence or otherwise of one of the three permission types (read, write, execute) for one of the three user types (owner, group, world). Thus the string "rwxr-x--x" indicates that the owner has read, write and execute permissions, the group has read and execute permissions, and other users have execute permission. The permissions can also be represented numerically as a set of three octal numbers, one number for each type of user. With each octal number represented by three bits, the first bit (octal 4) refers to read access, the second bit (octal 2) refers to write access, and the third bit (octal 1) refers to execute access; an access type is permitted if the corresponding bit is set to '1'. A value of octal 5 thus corresponds to the first and third bits being set to '1' and represents read and execute permission for the associated user. The foregoing example permission string of "rwxr-x--x" can thus be expressed as 751. The command chmod (change mode) can be used to change the mode attribute 24 and thereby alter the access permissions for the associated file.

In the present embodiment, the mode attribute serves as the WORM attribute for a file; more particularly, where the permissions are represented by three octal numbers and each has an octal value of only '4' or '0' indicating that only read permissions are present, then the file is taken as being a WORM file. Although typically the permission octal triple will be 444 (read access for all user types), this may not be the case as the retention regime being implemented may limit the type of user that can access a file during its retention period.

More detailed descriptions will now be given of the various processes carried out by the retention manager 16 in the course of setting a retention date, extending a retention date, checking for retention date expiry, and reviewing an expired retention date.

Figure 3:
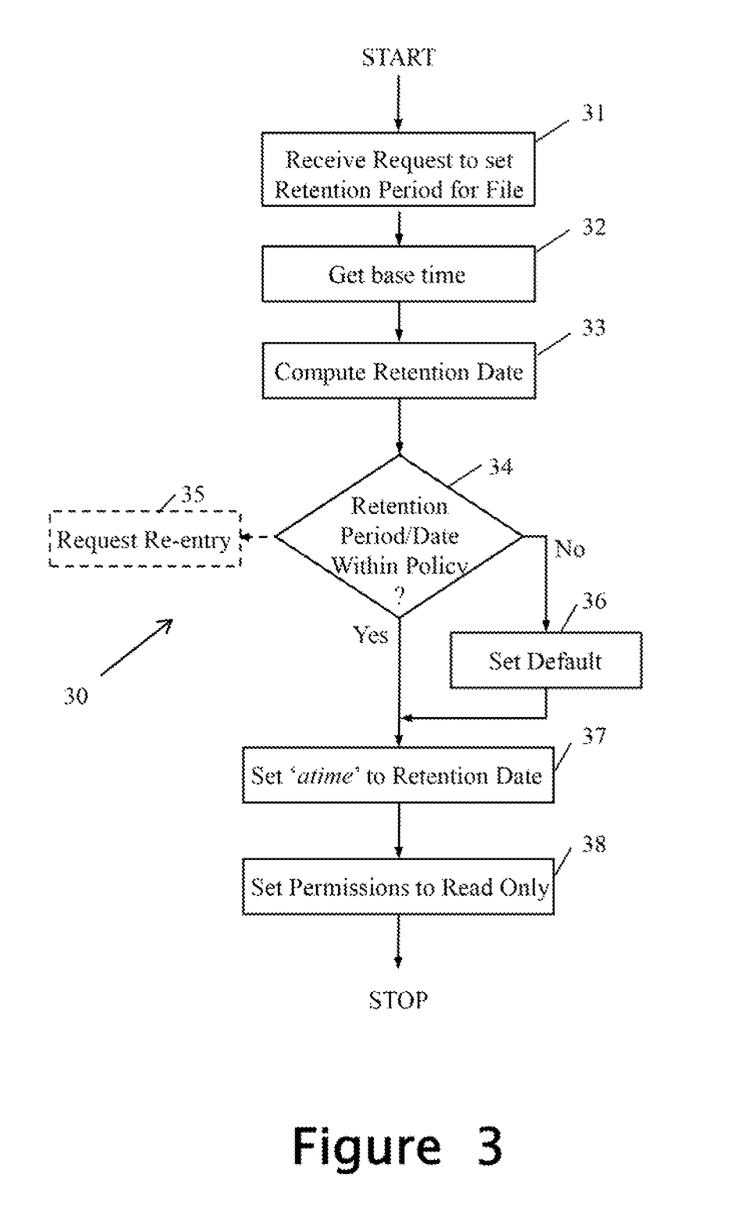
FIG. 3 is a flow chart of a retention date setting process of a retention management utility of the FIG. 1 embodiment.

Considering first the process of setting a retention date for a file, a flow chart of this setting process 30 is depicted in FIG. 3 and comprises the following steps:

Step 31 The retention manager 16 receives a request (from the admin interface 17 or application 18) to set a particular retention period for an identified file (already present in the filesystem).

Step 32 The retention manager 16 retrieves a base time (indicative of the current date); this may be retrieved, for example, from the trusted clock 19, from the system clock, from the atime attribute (the last access time will effectively be current at least in terms of the timescale of the usual duration of file retention—that is, years).

Step 33 The retention manager 16 computes the retention date to be stored by adding the particular retention period specified in the request received in step 31 to the base time retrieved in step 32.

Step 34 The retention manager 16 carries out an automatic check as to whether the retention period and/or the retention date complies with the retention policy being implemented. If this check is failed (for example, because the specified retention period is less than a minimum period set by the policy) then step 36 is carried out next; if the check is passed, processing proceeds to step 37.

Step 36 The setting process automatically sets a retention date based on a default retention period and then proceeds to step 37. The default retention period, rather than simply being one fixed period, can be adaptive, being, for example, set to the minimum period allowed in the case of a too-short retention period having been initially specified, and to the maximum allowed in the case of a too-lengthy retention period having been initially specified.

Rather than immediately enforcing a default retention period as just described, the process 30 in exiting step 34 may first give the originator of the request, at least where the latter is a human user operating through the admin interface 17, the opportunity to re-enter the desired retention period (this option is represented in FIG. 3 by dashed box 35).

Step 37 The retention manager 16 stores the retention date to a standard attribute of the inode data structure; the attribute chosen is conveniently one of the time stamps and, in particular, the atime attribute as this has minor significance while a file is held as a WORM file. The attribute chosen to store the retention date should not be the attribute used as the WORM attribute (in the present embodiment, the mode attribute). The attribute used for the retention date, whichever it is, thereby becomes one relevant to the WORM status of the file and therefore an attribute to be protected by the WORM protection features 15 (except, in the present embodiment, for retention date extension by the retention manager) while the associated file has WORM designation; this may simply involve setting a flag to indicate that the attribute is read-only, the filesystem functionality already being arranged to respect such a flag and not write to an attribute so flagged. It will be appreciated that normal usage by the filesystem functionality 13 of the attribute chosen to hold the retention date will be effectively suspended while the attribute is used for retention date storage.

Step 38 The retention manager 16 designates the file as a WORM file by appropriate setting the WORM attribute—in the present embodiment, this is done by setting the file access permissions in the mode attribute to read-only for all user types (this corresponds to the command chmod 444 in respect of the file concerned).

In a variant of the above-described retention-date setting process, rather than the retention date being calculated as a delta from a base time, a specific retention date may be received as input and used directly (after appropriate checks relative to the retention policy being implemented).

On completion of the setting process 30, a retention date has been stored to the atime attribute and the permissions in the mode attribute have been set to read-only indicating that the associated file is a WORM file. The WORM protection features 15 subsequently operate to prevent deletion or change of the file and at least certain of its inode attributes (including those relevant to its WORM status, that is, the mode and atime attributes) except in the already-mentioned case of the retention manager 16 responding to a request to extend the retention period (that is, move the retention date forward) by storing a new retention date in the atime attribute. It will be appreciated that most of the attributes in the inode will, in fact, be protected, particularly the file size, block pointer and user ID attributes.

Handling retention period extension requests is effected by a retention-period extension process (not illustrated) of the retention manager 16, this process operating to validate any extension requests by checking that the new retention date is indeed in advance of that currently stored and, if required by the retention policy, checking that the extension request comes from an appropriately authorised user. Only if these checks are passed is the retention period extended by setting a new retention date in the atime attribute.

Figure 4:
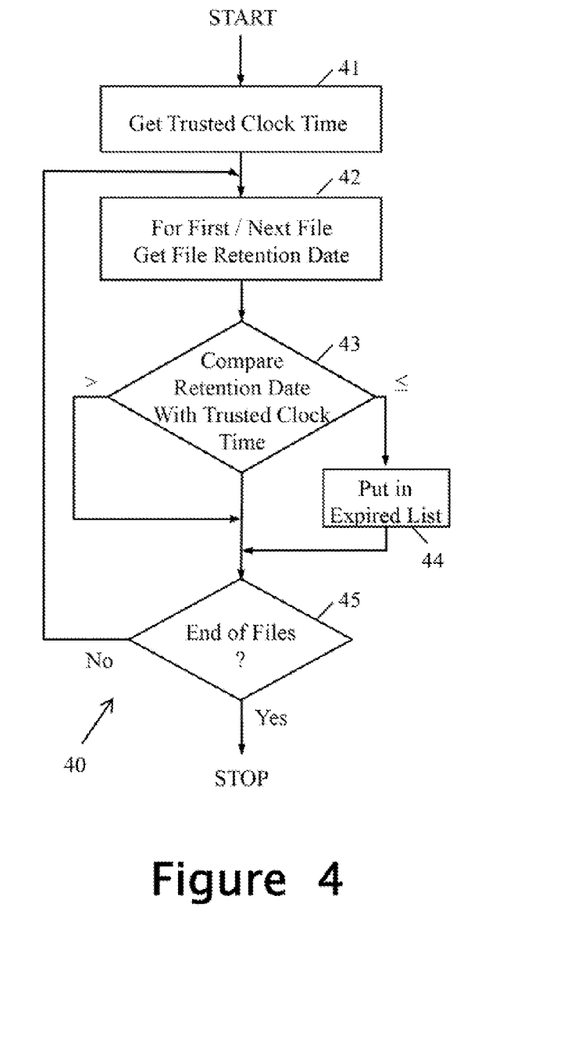
FIG. 4 is a flow chart of a retention date expiry-checking process of the retention management utility of the FIG. 1 embodiment.

In order to recognize when a WORM file has exited its retention period, the retention manager 16 is arranged to periodically run a retention-period expiry checking process 40 in which it checks for the expiration of the retention period of each file in a predetermined group of files; this group may comprise all WORM files in the filesystem or a subset that, for example, changes at each running of the expiry-checking process 40 such that over a suitably short period of time all the WORM files in the system are checked. A flow chart of the expiry-checking process 40 is depicted in FIG. 4 and comprises the following steps:

Step 41 The retention manager 16 retrieves the current time from the trusted clock 19; this time is temporarily held in memory and used throughout the whole process—that is, the same current time value is used to check for expiry of all files in the group being checked by the current execution of the expiry-checking process 40 (it will be appreciated that this done for efficiency and it is also possible to read the system clock afresh for each file to be checked).

Step 42 The retention manager 16 accesses the inode metadata of the first/next file to be checked; in particular, the retention date stored in the atime attribute is read.

Step 43 The retention manager 16 compares the retention date read in step 42 with the current time value retrieved in step 41. If the retention date is equal to, or less than (that is, earlier than) the current time value, step 44 is executed next; otherwise processing continues at step 45.

Step 44 The retention manager 16 adds an identifier of the current file to an 'expired' list and processing continues at step 45.

Step 45 Processing in respect of the current file is now complete and the retention manager 16 proceeds by checking whether it has processed all files in the current group; if this is the case, the expiry-checking process terminates, otherwise processing resumes at step 42.

On completion of the retention-date expiry checking process 40, the retention manager 16 initiates a review of the files in the 'expired' list by an administrator or other designated party (the 'reviewer') in order to determine the fate of these files. Rather than carrying out the active retention-date checking process 40 described above, an alternative approach is use lazy discovery of files that have passed their retention dates. With lazy discovery, the retention manager 16 would only check the retention date of a file when that file is touched for some other reason (file read, a delete attempt, filename rename attempt, etc.). A file that has passed its retention date can either be flagged for immediate review or placed in an 'expired' list for review at a later date.

Figure 5:
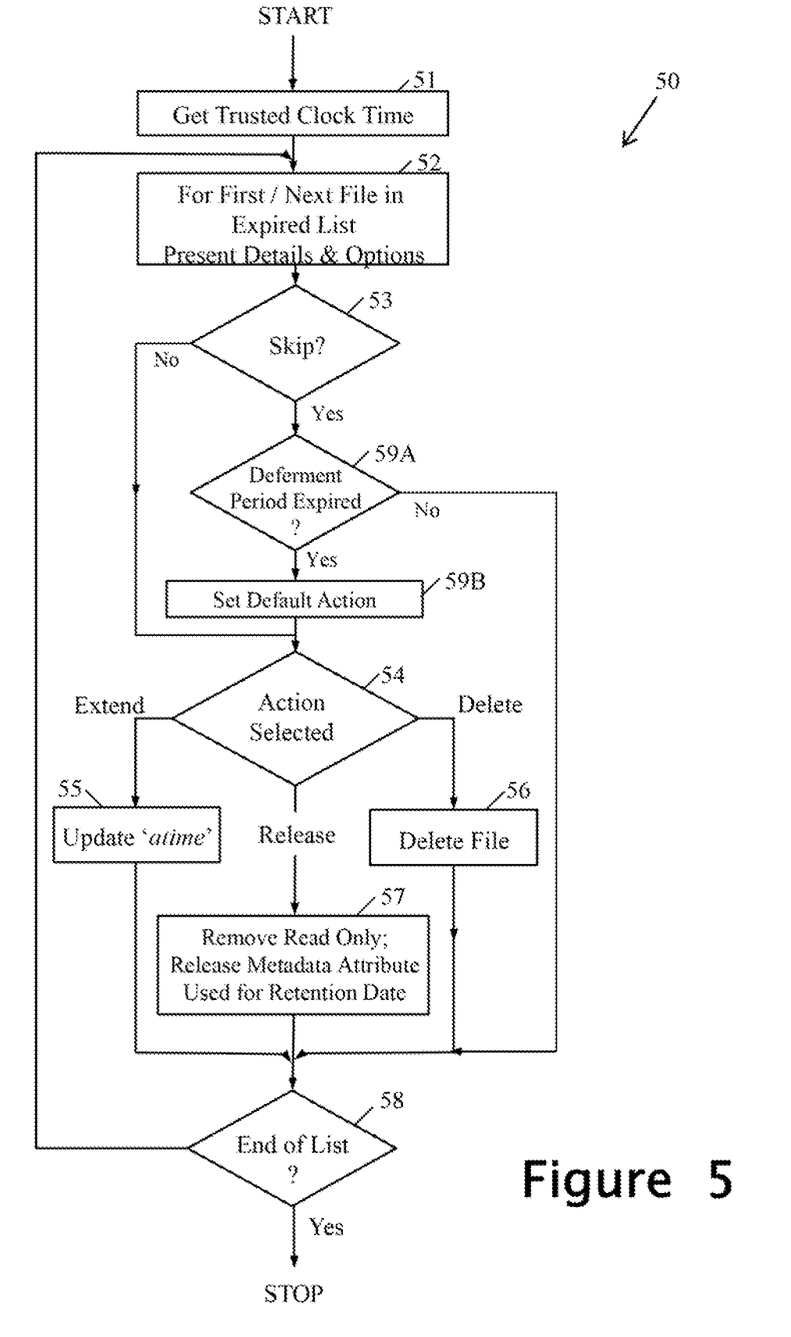
FIG. 5 is a flow chart of a retention review process of the retention management utility of the FIG. 1 embodiment.

The review of the expired list is controlled by a review process 50 run by the retention manager 16 (review of individual files can be effected using a simplified version of the process 50). A flow chart of the review process 50 is depicted in FIG. 5 and comprises the following steps:

Step 51 The retention manager 16 retrieves the current time from the trusted clock 19; this time is temporarily held in memory and used throughout the whole review process.

Step 52 The retention manager 16 accesses the basic details of the first/next file in the 'expired' list (these basic details being retrieved from the file metadata and potentially from the file itself). The basic details are presented to the reviewer (for example, through the admin interface 17) together with a list of options for how the file is to be treated from now on. In the present example embodiment, these options comprise:
an option to delete the file from the storage system,
an option to extend the retention period,
an option to release the file from its WORM designation but to retain the file in the storage system, and
an option to skip to the next file in the 'expired' list.
The first three options ('delete', 'extend', 'release') are disposition options—that is they dispose of the current file with a decision on its fate. The fourth option ('skip') defers a decision on the fate of the file—as will be seen, such a deferment is only permitted for a limited period.

Step 53 On receipt of the reviewer's selected option, the retention manager 16 checks whether the selected option is the 'skip' option or a disposition option; if the 'skip' option has been selected, processing continues at step 59A, whereas if a disposition option has been selected, processing continues at step 54.

Step 54 This step simply redirects processing to one of steps 55, 56, 57 according to the selected disposition option.

Step 55 If the 'extend' option has been selected, then the retention period is extended by updating the retention date stored in the 'atime' attribute after obtaining the desired extension term from the reviewer.

Step 56 If the 'delete' option has been selected, then the file and its metadata are deleted from the filesystem (with either the WORM designation of the file being rescinded first to permit deletion, or the WORM protection features being temporarily overridden).

Step 57 If the 'release' option has been selected indicating that the WORM designation of the file is to be rescinded but the file is to be retained in the filesystem, then:
the file's WORM designation is removed (in the present embodiment this is done by changing the access permissions in the mode attribute from read-only, the exact permissions set being policy dependent); and
the metadata attribute used for storing the retention date (the 'atime' attribute in the present embodiment) is released from this purpose by removing the retention date from the attribute and re-enabling the filesystem functionality to use the attribute for its normal purpose (for example, by resetting an associated flag that when set indicates read-only status for the attribute).

Step 58 After the selected disposition option has been carried out in step 55, 56 or 57, a check is made as to whether there are further files to process in the 'expired' list; if so, processing returns to step 52, otherwise processing terminates.

Step 59A If the 'skip' option was identified in step 53, then a check is made as to whether deferment of a decision on the fate of the current file has exceeded a predetermined permitted deferment duration. This is done by first determining the actual length of deferment by comparing the retention date (still present in the file's 'atime' attribute) with the current time retrieved in step 51, and then comparing this value with the permitted deferment duration. If the permitted deferment duration has not been exceeded, skipping to the next file in the 'expired' list is allowed and processing jumps to step 58; however, if the permitted deferment duration has been exceeded, then processing continues at step 59B.

Step 59B A default disposition option is imposed (which option is imposed will depend on the retention policy being applied) and processing continues at step 54.

The above described retention management method and apparatus can be applied to any form of WORM storage system, including single platform systems and high performance distributed systems spread across multiple servers.

Figure 6:
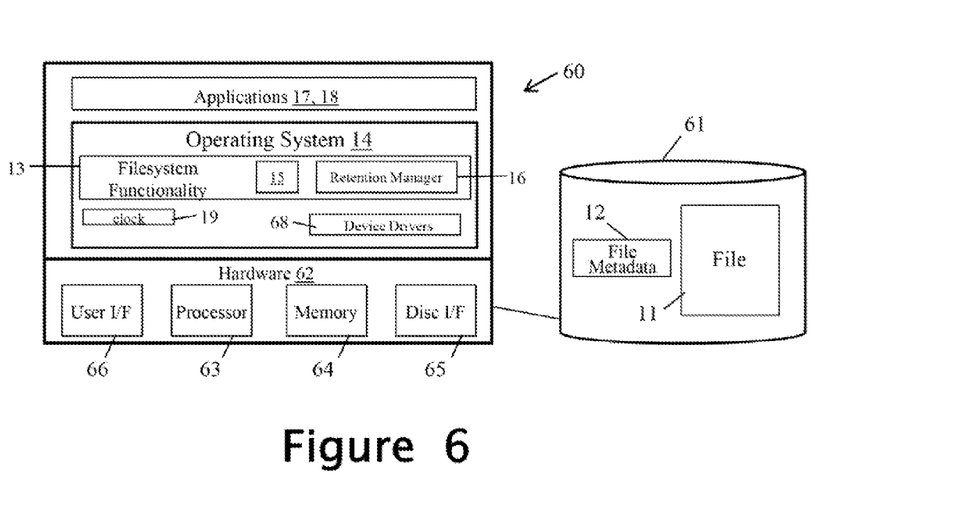
FIG. 6 is a diagram of a single-computer operating environment for the FIG. 1 embodiment.

FIG. 6 illustrates an implementation of the described retention management method and apparatus for a storage system comprising a computer 60 and directly attached storage 61 in the form of one or more hard disks. The computer 60 comprises standard hardware components including processor 63, memory 64 (both volatile and non-volatile), disc interface hardware 65, and user interface hardware 65 (such as a monitor, keyboard and mouse). The software and data elements depicted in FIG. 1 map directly onto the FIG. 6 system with the operating system 14 of FIG. 1 being formed by the operating system of the computer 60; the filesystem functionality 13 of the latter is adapted to include both the WORM protection features 15 and the retention manager 16 of FIG. 1. The filesystem itself (including file 11 and its metadata 12) is stored on the disc storage 61 and the operating system 14 interacts with the storage 61 through device drivers 68 and the disc interface 65. The trusted clock 19 of FIG. 1 is provided by the operating system clock in FIG. 6. It will be appreciated that network attached storage or a storage area network (SAN) could be used alternatively/additionally to the directly attached storage 61.

Figure 7:
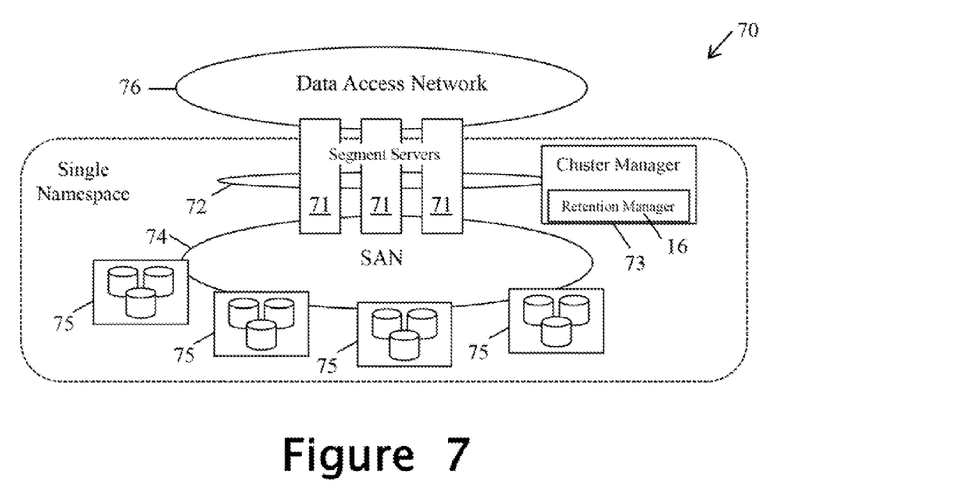
FIG. 7 is a diagram of a cluster storage operating environment for the FIG. 1 embodiment.

FIG. 7 illustrates an implementation of the described retention management method and apparatus for a cluster storage system 70 in which a single namespace filesystem is distributed across a cluster of servers 71 that all work together to provide high performance service to clients. The system 70 is, for example, configured to run the Ibrix Fusion cluster filesystem software available from Hewlett-Packard Company with components of this software running on each of the servers 71 (termed 'segment servers') to provide the unified namespace, and management software running on a cluster manager computing platform 73. The segment servers 71 and cluster manager 73 are all interconnected with each other by private network 72. The software component providing the cluster manager functionality can alternatively be run on one of the segment server platforms. The segment servers 71 connect via a storage area network (SAN) 74 to storage units 75 of a storage subsystem holding the unified filesystem. Clients (not shown) connect to the segment servers 71 over data access network 76. Rather than the networks 72, 74, 76 being independent of each other, one or more of these networks may share network infrastructure.

In the FIG. 7 storage system 70, the filesystem functionality 13 of FIG. 1, including the WORM protection features 15 but not the retention manager 16, is provided by the filesystem functionality of the individual operating systems of the segments servers 71 (where the operating system used is Linux, the filesystem code is for example, 'ext2' or 'ext-3'). The retention manager 16 of FIG. 1 can conveniently be incorporated into the cluster manager 73 of FIG. 7. In this case, communication between the retention manager 16 and the filesystem functionality of the individual segment servers should take place over a trusted communication path (network 72 can be implemented to provide this) or use authentication to enable the segment servers to trust changes requested by the retention manager. It would alternatively be possible to implement the retention manager 16 by replicating its functionality in each of the segment servers 71.

It will be appreciated that many variations are possible to the above described retention management method and system. For example, as already noted, the WORM status of a file can be explicitly stored in a dedicated file attribute rather being determined from inspection of the file permissions set for the file.

It is also possible to arrange for the original state of the file metadata to be preserved. For example, in step 37 of the retention-date setting process 30, before the retention date is stored to the attribute selected for this purpose (e.g. the atime attribute) the existing contents of the attribute are copied and stored elsewhere in the system together with an indication of the file concerned. Subsequently, in step 57 when a file is released from retention and the retention date is removed from the attribute used to store it during the retention period, the original contents of the attribute can be retrieved and restored.

Rather than storing the retention date to an existing file attribute of the inode data structure, a new attribute could be created in the inode data structure (or other file metadata data structure) and used to store the retention date in step 37 of the setting process 30; this attribute would then be deleted as part of processing the 'release' disposition option in step 57 of the review process 50. In this case, the WORM protection features 15 would be adapted to prevent deletion or change of the newly created attribute while the file concerned had WORM designation (except for allowing retention date extension). The 'atime' attribute would retain its normal purpose and would be used in standard manner.

Reference has been made above to the possibility of a privileged user being able to modify and/or delete files or metadata. As used herein, the term "privileged user" means a user having rights to modify and/or delete files or metadata not afforded to a normal user; typically, this would be the root user or administrator but it is also be possible, for example, to arrange for the WORM protection features 15 to allow a particular pre-designated user to modify and delete files and metadata subject to prior user authentication.

In the foregoing, the example retention method and system embodying the invention has been described in relation to files and their metadata; it is, however, to be understood that the retention method and system can be used in relation to any structuring of data (herein a 'dataset') capable of being handled as a single logical entity and having associated metadata.

The invention claimed is:

1. A method of retention management in a write-once-read-many WORM storage system in which WORM datasets, and details and at least certain of their attributes including those relevant to WORM status, are protected from change or deletion, the method comprising:

setting a given dataset for retention for a particular retention period by storing a corresponding retention date in a first attribute of the given dataset, and setting a WORM attribute to indicate that the given dataset is a WORM dataset, wherein at least the first attribute and the WORM attribute are stored along with the given dataset in a file system; determining expiry of the retention period for the given dataset by comparing the stored retention date with a current time; and in response to determining the expiry of the retention period: removing the stored retention date from the first attribute, and changing the WORM attribute to indicate that the given dataset is no longer a WORM dataset wherein the first attribute is one of the dataset's existing attribute and is to store a first metadata type when the given data is not a WORM dataset, wherein the first metadata type when the given dataset is not a WORM data, wherein the first metadata type is different from the retention date, and further comprising, in response to determining the expiry of the retention period, the first attribute to store the first metadata type wherein prior to storing the retention date in the first attribute, an original value of the first attribute is stored elsewhere, this original value being subsequently restored at the time the stored retention date is removed from the first attribute, wherein the original value is of the first metadata type.

2. A method of retention management in a write-once-read-many WORM storage system in which WORM datasets, and details and at least certain of their attributes including those relevant to WORM status, are protected from change or deletion, the method comprising:

setting a given dataset for retention for a particular retention period by storing a corresponding retention date in a first attribute of the given dataset, and setting a WORM attribute to indicate that the given dataset is a WORM dataset, wherein at least the first attribute and the WORM attribute are stored along with the given dataset in a file system; determining expiry of the retention period for the given dataset by comparing the stored retention date with a current time; and in response to determining the expiry of the retention period: removing the stored retention date from the first attribute, and changing the WORM attribute to indicate that the given dataset is no longer a WORM dataset wherein the first attribute is newly-created upon setting the given dataset for retention for the particular retention period; the subsequent removal of the stored retention date following expiry of the retention period being carried out by the selective deletion of the first attribute created to store the retention date.

3. A method of retention management in a write-once-read-many WORM storage system in which WORM datasets, and details and at least certain of their attributes including those relevant to WORM status, are protected from change or deletion, the method comprising:

setting a given dataset for retention for a particular retention period by storing a corresponding retention date in a first attribute of the given dataset, and setting a WORM attribute to indicate that the given dataset is a WORM dataset, wherein at least the first attribute and the WORM attribute are stored along with the given dataset in a file system; determining expiry of the retention period for the given dataset by comparing the stored retention date with a current time; and in response to determining the expiry of the retention period: removing the stored retention date from the first attribute, and changing the WORM attribute to indicate that the given dataset is no longer a WORM dataset wherein the storage system permits the step of removing the stored retention date and changing the WORM attribute, to be deferred for a predetermined deferment period beyond the retention date, the method further comprising checking for expiry of the deferment period and on determining its expiry, carrying out the step of removing the stored retention date and changing the WORM attribute.

4. A write-once-read-many WORM storage system comprising: associated attributes including a WORM attribute indicating the dataset's WORM status, protect WORM datasets and at least certain of their attributes, including those relevant to WORM status, from change or deletion; and a retention manager to: set a given dataset for retention for a particular retention period by storing a corresponding retention date in a first attribute of the given dataset, and setting the WORM attribute to indicate that the given dataset is a WORM dataset; determine expiry of the retention period for the given dataset by comparing the stored retention date with a current time; and in response to determining the expiry of the retention period: remove the stored retention date from the first attribute, and change the WORM attribute to indicate that the given dataset is no longer a WORM dataset Wherein the first attribute is one of the dataset's existing attributes and is to store a first metadata type when the given dataset is not a WORM dataset, wherein the first metadata type is different from the retention date; the retention manager being further arranged to, in response to determining the expiry of the retention period, restoring the first attribute to store the first metadata type wherein the retention manager, prior to storing the retention date in the first attribute is to store an original value of the first attribute elsewhere in the storage system, the retention manager being further to restore this original value to the first attribute at the time the stored retention date is removed from the attribute, wherein the original value is of the first metadata type.

5. A write-once-read-many WORM storage system comprising: associated attributes including a WORM attribute indicating the dataset's WORM status, protect WORM datasets and at least certain of their attributes, including those relevant to WORM status, from change or deletion; and a retention manager to: set a given dataset for retention for a particular retention period by storing a corresponding retention date in a first attribute of the given dataset, and setting the WORM attribute to indicate that the given dataset is a WORM dataset; determine expiry of the retention period for the given dataset by comparing the stored retention date with a current time; and in response to determining the expiry of the retention period: remove the stored retention date from the first attribute, and change the WORM attribute to indicate that the given dataset is no longer a WORM dataset wherein the retention manager is to create the first attribute upon setting the given dataset for retention for the particular retention period, the retention manager being further to carry out the subsequent removal of the stored retention date following expiry of the retention period by the selective deletion of the first attribute created to store the retention date.

6. A write-once-read-many WORM storage system comprising: associated attributes including a WORM attribute indicating the dataset's WORM status, protect WORM datasets and at least certain of their attributes, including those relevant to WORM status, from change or deletion; and a retention manager to: set a given dataset for retention for a particular retention period by storing a corresponding retention date in a first attribute of the given dataset, and setting the WORM attribute to indicate that the given dataset is a WORM dataset; determine expiry of the retention period for the given dataset by comparing the stored retention date with a current time; and in response to determining the expiry of the retention period: remove the stored retention date from the first attribute, and change the WORM attribute to indicate that the given dataset is no longer a WORM dataset
 wherein the retention manager is arranged to permit the removing of the stored retention date and changing of the WORM attribute, to be deferred for a predetermined deferment period beyond the retention date, the retention manager being further arranged to check for expiry of the deferment period and on determining its expiry, to remove the stored retention date and change the WORM attribute.

\* \* \* \* \*